United States Patent Office.

JOSEF STIEL, OF COLOGNE, GERMANY.

ENAMEL FOR COATING BRICKS.

SPECIFICATION forming part of Letters Patent No. 429,659, dated June 10, 1890.

Application filed June 3, 1889. Serial No. 312,951. (No specimens.)

*To all whom it may concern:*

Be it known that I, JOSEF STIEL, a subject of the Emperor of Germany, residing at Cologne-on-the-Rhine, Germany, have invented certain new and useful Improvements in Enamels for Coating Bricks for Building Purposes; and I do hereby declare that the following is a full, clear, and exact description of the invention, which will enable others skilled in the art to which it appertains to make and use the same.

This invention relates to the production and use of an enamel which, applied to the surfaces of building materials and the like by a special process, makes the same proof against atmospheric destruction and gives them a pleasing appearance. Instead of the coating, one can manufacture of the enamel also separate plates or tiles or any kinds of building materials for the ornamentation of the surfaces of buildings or for covering other rough surfaces.

The enamel is produced by mixing gravel, (silicic acid,) phosphorite, or analogous mineral, carbonate of soda, potash, cryolite, and fluor-spar with metallic oxides, according to the color to be given to the product, in a furnace with great heat. General directions concerning the proportions in which the said ingredients are to be mixed cannot be given, since such depend upon the degree of temperature existing in the smelting-furnace, upon the nature of the materials which are to be coated with enamel and the substances of which they are composed, upon the amount of hardness occasioned by the burning, upon the nature of the surface, whether the same is to be smooth, rough, or perfectly crude, and also upon whether the material shrinks much when cooling down, &c.

For covering the materials with an enamel thus prepared either of two different processes can be employed, consisting in putting a layer of the enamel upon the surfaces to be covered, or in dipping the material to be enameled into the hot liquid enamel substance. If the materials are to have a plastic shape, they are inserted into a suitable mold for the purpose of pressing, and are cooled gradually in a suitable cooling-furnace.

The materials covered with a weather-proof and anti-acid enamel of required thickness and color can be roughened or grained or polished on the respective surface, according to the finish required. They can also be ornamented with designs by etching or sand-blast, which, as is well known, is impossible in practice with materials which are only glazed without destroying the same.

The enamel is especially durable as applied to bricks of burnt clay. Besides, it is suitable as a protecting and ornamental cover for bricks, casing-bricks, window-sills, jamb-stones, balcony-supports, and other building material within and without, for fittings—such as baths, tables, and other furniture—as well as slabs or tiles for floors, wall-coverings, flags, and the like.

I claim—

An enamel composed of a mixture of gravel, silicic acid, phosphorite, or analogous minerals, carbonate of soda, potash, cryolite, apatite, fluor-spar, and of metal oxides for suitable coloring, substantially as set forth.

In witness whereof I have signed this specification in presence of two witnesses.

JOSEF STIEL.

Witnesses:
GUSTÁVE ALBERT OELRICHS,
W. D. WARNER.